United States Patent
Lin et al.

(10) Patent No.: US 10,968,102 B2
(45) Date of Patent: Apr. 6, 2021

(54) METHOD FOR PRODUCING BLACK PHOSPHORUS

(71) Applicant: Black P2 (USA) INC., Bakersfield, CA (US)

(72) Inventors: Ming Lin, Bakersfield, CA (US);
Hejun Wang, Bakersfield, CA (US);
Xinyue Lin, Bakersfield, CA (US);
Xinyang Lin, Bakersfield, CA (US);
Yifei Wang, Bakersfield, CA (US); Sam Zhang, Bakersfield, CA (US); Ruoyu Xu, Monterey Park, CA (US); Jizhou Yang, Monterey Park, CA (US);
Yixiang Wang, Bakersfield, CA (US)

(*) Notice: Subject to any disclaimer, the term of this patent is extended or adjusted under 35 U.S.C. 154(b) by 0 days.

(21) Appl. No.: 16/442,826

(22) Filed: Jun. 17, 2019

(65) Prior Publication Data
US 2019/0382268 A1    Dec. 19, 2019

(30) Foreign Application Priority Data
Jun. 15, 2018   (CN) .......................... 201810623687.2

(51) Int. Cl.
*C01B 25/02* (2006.01)
*B01J 6/00* (2006.01)
*C01B 25/00* (2006.01)

(52) U.S. Cl.
CPC .............. *C01B 25/02* (2013.01); *B01J 6/004* (2013.01); *C01B 25/003* (2013.01); *C01P 2002/72* (2013.01); *C01P 2006/40* (2013.01)

(58) Field of Classification Search
CPC ........ C01B 25/02; C01B 25/003; B01J 6/004; B01J 6/001; C01P 2002/72; C01P 2006/40
See application file for complete search history.

(56) References Cited

FOREIGN PATENT DOCUMENTS

CN    105460910 B    *   2/2018

OTHER PUBLICATIONS

Zhang et al., "Two-step heating synthesis of sub-3 millimeter-sized orthorhombic black phosphorus single crystal by chemical vapor transport reaction method," Science China Materials 2016, 59(2): 122-134. Published online Feb. 26, 2016. (Year: 2016).*

* cited by examiner

*Primary Examiner* — Anthony J Zimmer
(74) *Attorney, Agent, or Firm* — Novoclaims Patent Services LLC; Mei Lin Wong (57) ABSTRACT

A method of producing black phosphorus which includes the steps of: weighing and mixing reaction raw materials which comprises metallic tin, red phosphorus and monocrystalline iodine, wherein a weight ratio of tin: red phosphorus: iodine is 0.6-3.5: 5-45: 0.1-0.8; feeding the mixture to a high-temperature resistant metal reaction tube; removing air by introducing inert gas and sealing the reaction tube tightly; placing the metal reaction tube inside a muffle furnace for carrying out calcination reaction by first increasing a temperature at a preset rate to a maximum temperature and keeping warm and then decreasing a temperature at a preset rate and keeping warm, then to room temperature so that the black phosphorus is produced. The conversion rate is very high and the quality of the produced product is classified as high quality.

1 Claim, 6 Drawing Sheets

METHOD FOR PRODUCING BLACK PHOSPHORUS

BACKGROUND OF THE PRESENT INVENTION

Field of Invention

The present invention relates to a method of producing black phosphorus, and more particularly to a method of producing black phosphorus suitable for large-scale production in a practical industrialized condition.

Description of Related Arts

Black phosphorus is a black, metallic luster crystal. Black phosphorus, white phosphorus (yellow phosphorus) and red phosphorus are the three isomers of phosphorus. Black phosphorus has an orthogonal structure, its crystal lattice is a six-membered ring that is linked to each other, and each atom is bonded to the other three atoms. Black phosphorus is a thermodynamically stable allotrope of phosphorus at room temperature and room pressure. It does not ignite in air and has the weakest reactivity. Therefore, black phosphorus is very difficult to produce. In general, black phosphorus is produced by heating white phosphorus under high pressure condition (12000 atm). Black phosphorus is very similar to graphite in appearance, performance and structure. It is black in color, has a sheet-like appearance, is electrically conductive, and forms a pleated sheet from the linked atoms. The phonons, photons and electrons in the layered black phosphorus structure exhibit high anisotropy and therefore the black phosphorus has a significant potential application value in electronic thin films and infrared optoelectronics technologies. Light absorption in black phosphorus is very sensitive to light polarization, film thickness and doping. Black phosphorus phototransistors also exhibit hyperspectral detection in infrared and visible light. The similarities between black phosphorus and graphite also include the possibility of stripping and the formation of phosphorous, which is a graphite-like material with excellent electron transfer properties. The stripped black phosphorus will easily be oxidized when exposed to air and water, and sublime when heating to 400° C. under vacuum condition. High-quality, low-layer black phosphorus nanosheets can be prepared by liquid phase stripping.

Black phosphorus is very difficult to prepare. First, the high temperature and high pressure conditions are very harsh. Then, after the ultra-high pressure synthesis, catalytic synthesis by using mercury and rhodium is studied. However, since the toxicity is high and the yield is low, it is not possible to industrialize production at large-scale. It is also possible to use a mineral, such as $SnI_4$, $Cu_2P_{20}$, added as a promoter in a vapor phase growth process to generate black phosphorus. In the phase transition of red phosphorus to black phosphorus, it may be accompanied by the formation of by-products including red phosphorus and $Au_3SnP_7$. The above method can grow black phosphorus crystals with a diameter of 1 to 2 mm in ten days, and the purity of black phosphorus can reach 99.999 at %. However, the black phosphorus produced is quickly oxidized and the cost is very high, thus making it difficult to develop and commercialize applications on a large scale.

At present, black phosphorus is mainly produced by converting red phosphorus to black phosphorus by high energy ball milling method. However, the temperature and pressure conditions are not easy to control and the energy consumption is high while the success rate of synthetic black phosphorus is low. The Chinese patent CN 106185849 A discloses a method for preparing nanometer black phosphorus by ball milling using red phosphorus as a raw material. The black phosphorus produced by the disclosed method has a particle size of 1-5 nm while the energy consumption is very high, thus the disclosed method fails to meet the demand for large-area two-dimensional black phosphorus.

The red phosphorus mineralization method usually involves the steps of sealing and heating red phosphorus with Sn, AuSn and $SnI_4$. The Chinese patent CN CN104310326A discloses a preparation method of monocrystalline black phosphorus by using red phosphorus, AuSn and tin tetraiodide as raw materials. However, this method or similar methods either utilizes catalyst material with high toxicity (such as $SnI_4$) or catalyst metal material which is very expensive (such as AuSn). Therefore, these methods are not suitable for industrial use. Some other methods utilize a quartz tube for heating process. The quartz tube is resistant to high temperatures. In practice, however, the quartz tube is very easy to break due to high temperature and high pressure condition, resulting in a very high breakage rate of the quartz tube and low possibility to re-use the quartz tube repeatedly. The cost of the quartz tube itself is also relatively high, which is not unfavorable to the control of production costs.

SUMMARY OF THE PRESENT INVENTION

An object of the present invention is to provide a method of producing black phosphorus, which is easy to operate and control, has reduced rate of breakage loss of the reaction tube during the reaction by replacing the conventional quartz tube with a high-temperature resistant metal reaction tube and so the reaction tube is recyclable while the black phosphorus produced has good performance.

Another object of the present invention is to provide a method of producing black phosphorus of high quality on a large-scale basis at a cost- and materials-effective manner.

According to the present invention, the foregoing and other objects and advantages are attained by a method of producing black phosphorus, comprising the steps of:

(a) weighing raw materials and mixing uniformly to form a mixture, wherein said raw materials comprises red phosphorus, tin and iodine according to a weight ratio of tin: red phosphorus: iodine=0.6~3.5:5~45:0.1~0.8;

(b) feeding the mixture to a high-temperature resistant metal reaction tube, introducing inert gas to the high-temperature resistant metal reaction tube to replace air inside the high-temperature resistant metal reaction tube with the inert gas;

(c) placing a high-temperature resistant metal gasket on a flange member of the metal reaction tube, covering the metal reaction tube with the flange member and tightening into position by a screw member;

(d) placing the metal reaction tube inside a muffle furnace for carrying out calcination reaction by first controlling a temperature increase at a rate 50-80° C./h to a first reaction temperature and keeping warm, to a second reaction temperature and keeping warm and to a third reaction temperature of 520~760° C. and keeping warm for 3~8 hours, and then by controlling a temperature decrease at a rate of 40-80° C./h to a first cooling temperature and keeping warm, then to a second cooling temperature and keeping warm, and finally to room temperature so that a final product of black phosphorus is obtained.

Preferably, a weight ratio of tin: red phosphorus: iodine=0.8~1.5:15~25:0.12~0.25.

Preferably, said raw materials further comprises molybdenum or tungsten having a weight of 0.5~1% of the total weight of the reaction raw materials.

Preferably, the maximum reaction temperature is 580~660° C.

Preferably, the first reaction temperature is 500° C., then keeping warm for 10~30 minutes; the second reaction temperature is 550-580° C., then keeping warm for 30~60 minutes; the first cooling temperature is 500° C., then keeping warm for 10~60 minutes; when the second cooling temperature is 350° C., then keeping warm for 10~60 minutes.

Preferably, the high-temperature resistant metal reaction tube is a stainless steel reaction tube or a reaction tube made of iron, aluminum, copper, zinc, nickel, tin, antimony, lead and their metal compounds. In particular, the stainless steel reaction tube is the most suitable metal reaction tube because it is resistant to high temperature, can be used repeatedly, is not easy to be broken, and its cost is moderate, which is beneficial to increase the production efficiency and scale of black phosphorus and is a breakthrough in the industry because the production process of the present invention can be carried out outside the laboratory, compared to the conventional method which has to be carried out in the laboratory.

Preferably, the high-temperature resistant metal reaction tube is a cylindrical tube having a diameter of 2.5~100 cm and a length of 10~200 cm; or a rectangular tube having a length of 1~200 cm, a width of 2.5~100 cm, and a height of 2.5~100 cm.

Preferably, a glass tube can be employed in the method of the present invention. In particular, the step (b) is substitute by the step of: feeding the mixture to a glass tube, replacing air inside the glass tube by inert gas and cover a glass tube opening of the glass tube and then placing the glass tube inside the high-temperature resistant metal reaction tube.

Preferably, a volume of the high-temperature resistant metal reaction tube is about 1.5~5 times of a volume of the glass tube so that the glass tube can be put into or taken out of the high-temperature resistant metal reaction tube easily and conveniently.

Preferably, the inert gas is mainly argon gas. The purity of the reaction raw materials is 99.5% or above, and preferably 99.9% or above. The form of the raw materials is not particularly limited and the raw materials may be in powder form, flake form, granular form, block form or crystal form. In particular, metallic tin in powder form or granular form with a particle size of 1.2-1.8 mm is preferred, red phosphorus in flake form is preferred, monocrystalline iodine in granular form with a particle size of 1.2-1.8 mm is preferred.

Compared to conventional arts, the present invention has the following advantageous effects:

1. Compared to conventional methods which require heating under a high pressure requirement of 12000 atm, the method of the present invention has no special pressure requirement. According to the present invention, during the process of heating from room temperature to the maximum reaction temperature of 520~760° C., the pressure of inert gas inside the reaction tube merely changes naturally with the change of reaction temperature and no specific pressure condition is required. Therefore, the reaction conditions are easy to control.

The equipment used in the method of the present invention is much safer and more reliable and is convenient to operate. According to the present invention, a high-temperature resistant metal reaction tube is employed, which is capable of fully withstanding the high temperature condition as required for the reaction and the associated pressure changes under the high temperature condition. Thus, breakage of the high-temperature resistant metal reaction tube due to frequent temperature changes by periodic heating and cooling and its associated pressure changes is avoided. In particular, the breakage problem of quartz tube is not reasonably foreseeable from the conventional methods, wherein the breakage of the quartz tube is not high when carried out in the laboratory for small batch size production. However, when the quartz tube is used for mass production, due to the influence of multiple factors such as temperature, pressure and operation factors, the breakage rate of the quartz tube is very high, thus the quartz tube cannot be re-used repeatedly and this greatly affect the production efficiency and production costs of producing black phosphorus. According to the present invention, the preferred reaction tube is made of stainless steel because, first, stainless steel is a high-temperature resistant material which will not deform or crack under high temperature and so the reaction tube can be re-used repeatedly; and second, the stainless steel will not adversely affect the reaction itself so that the final product of black phosphorus produced will have good properties. Also, stainless steel is a metal material which can heat up and cool down quickly, therefore these properties further promotes the production of black phosphorus to a certain extent and hence increases the production efficiency.

3. According to the present invention, the reaction raw materials can first be put inside a glass tube and then the glass tube can be placed inside the high-temperature resistant metal reaction tube so that a double-tube arrangement is used. The glass tube has a glass tube opening and a plug is used to cover the glass tube opening. Since the plug is not a fixed sealing to the glass tube opening, when the gas pressure inside the glass tube is too large, the pressure can be released by the plug being pushed away from the glass tube opening, thus reducing the possibility of breakage of the glass tube. The glass tube materials can generally fully withstand the maximum reaction temperature of 520~760° C. Moreover, even though the reaction raw materials are scattered outside the glass tube after the plug is unplugged from the glass tube, the reaction raw materials are still kept inside the high-temperature resistant metal reaction tube.

4. Compared to conventional methods which utilize catalysts such as mercury, bismuth, $SnI_4$, and gold compounds for black phosphorus production, which has the problems of high toxicity or high cost and so unsuitable for industrialize mass production, the method of the present invention utilizes red phosphorus, tin and iodine as raw materials, thus the cost and toxicity are reduced dramatically while the quality of the produced black phosphorus product is increased.

5. The method of the invention also adds a small amount of molybdenum or tungsten to the raw material, which can promote the action of the catalyst, accelerate the formation of black phosphorus, and shorten the reaction time.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
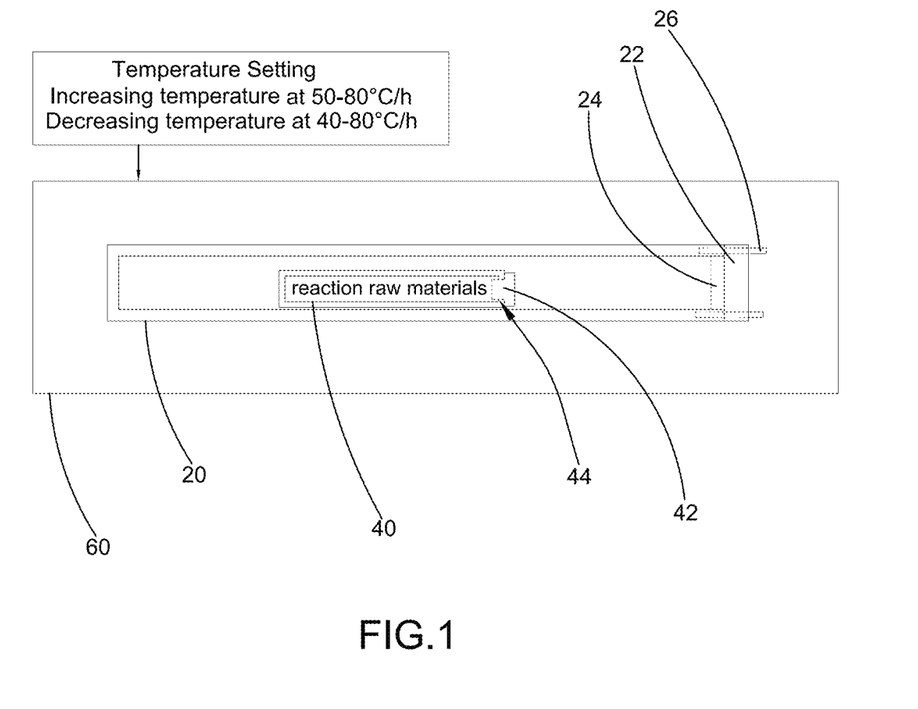
FIG. 1 is a schematic diagram illustrating the apparatus and method for producing black phosphorus according to a preferred embodiment of the present invention.
Figure 2:
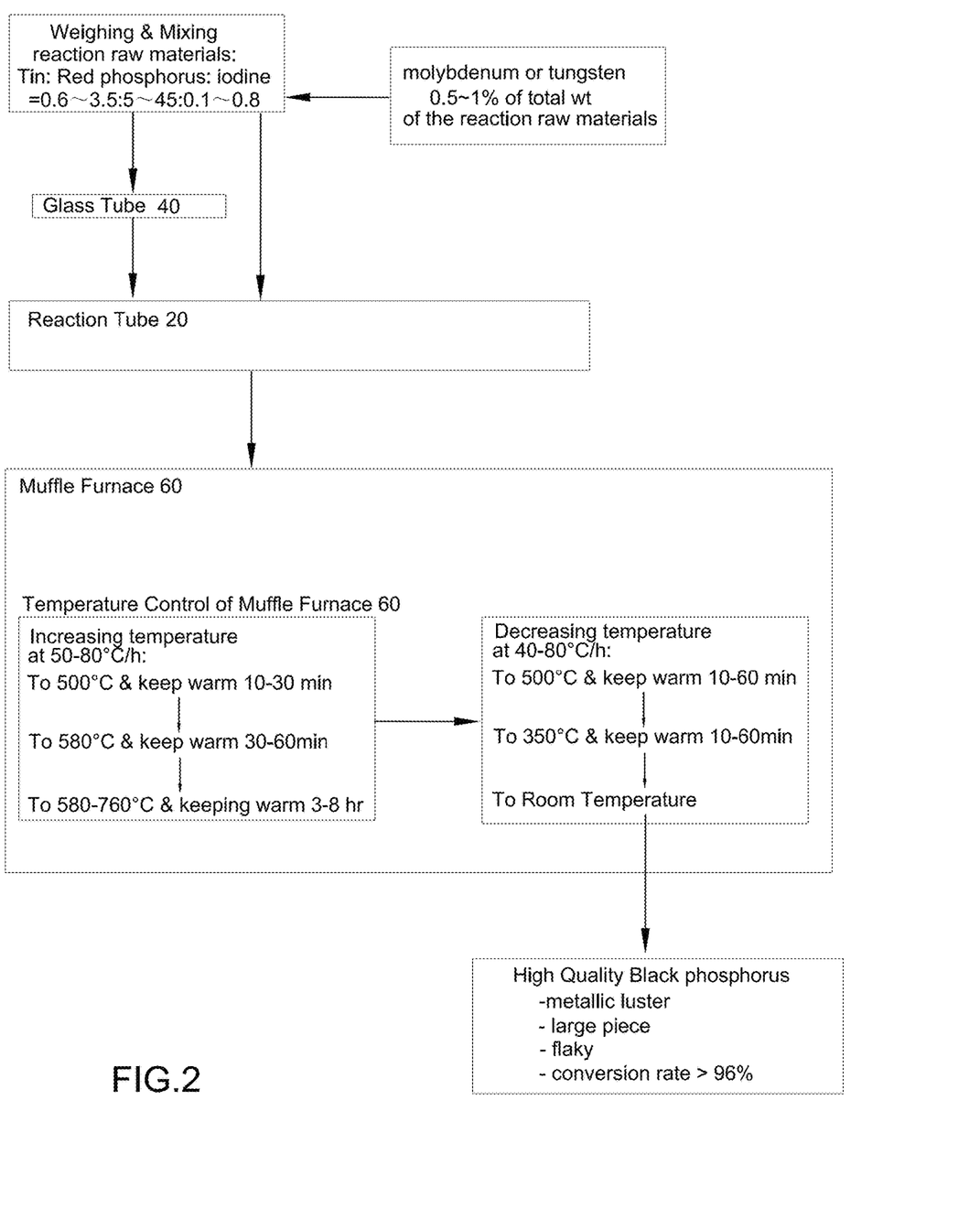
FIG. 2 is a schematic diagram illustrating the method for producing black phosphorus according to the preferred embodiment of the present invention.
Figure 3:
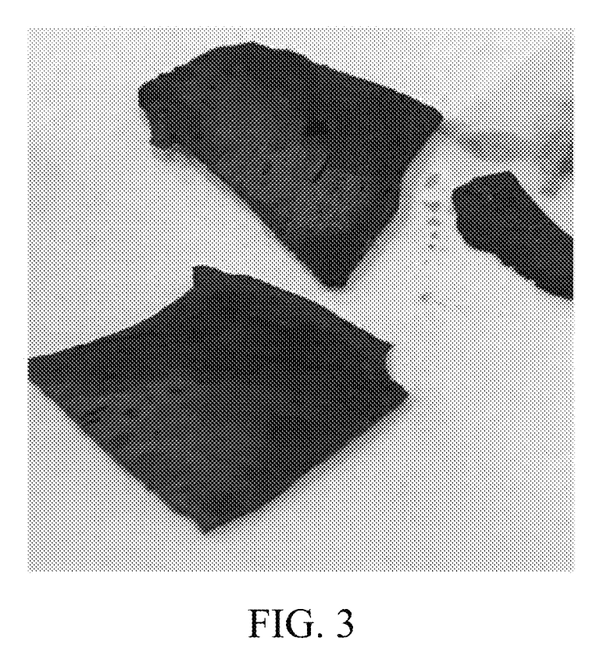
FIG. 3 is a photo illustrating the black phosphorus produced by the method of the present invention.
Figure 4:
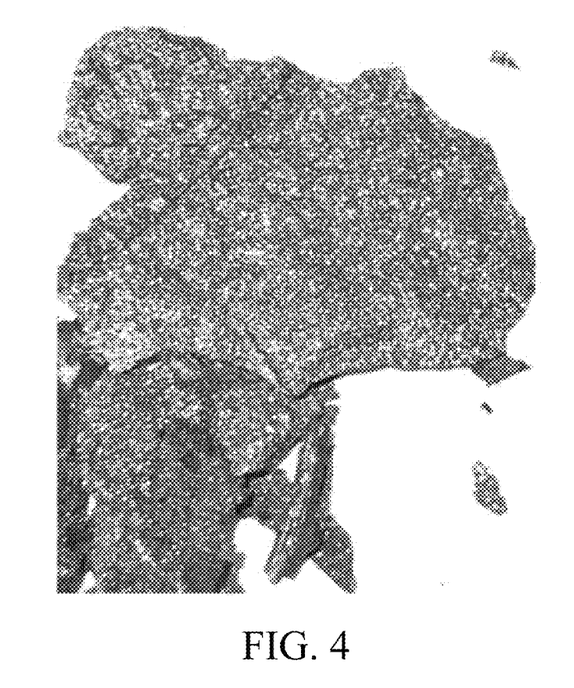
FIG. 4 is a photo illustrating the black phosphorus produced by the method of the present invention.
Figure 5:
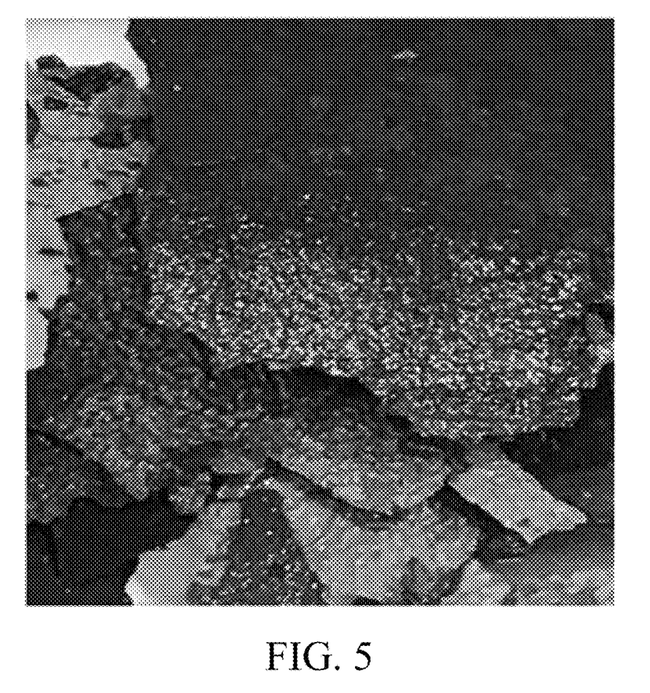
FIG. 5 is a photo illustrating the black phosphorus produced by the method of the present invention.
Figure 6:
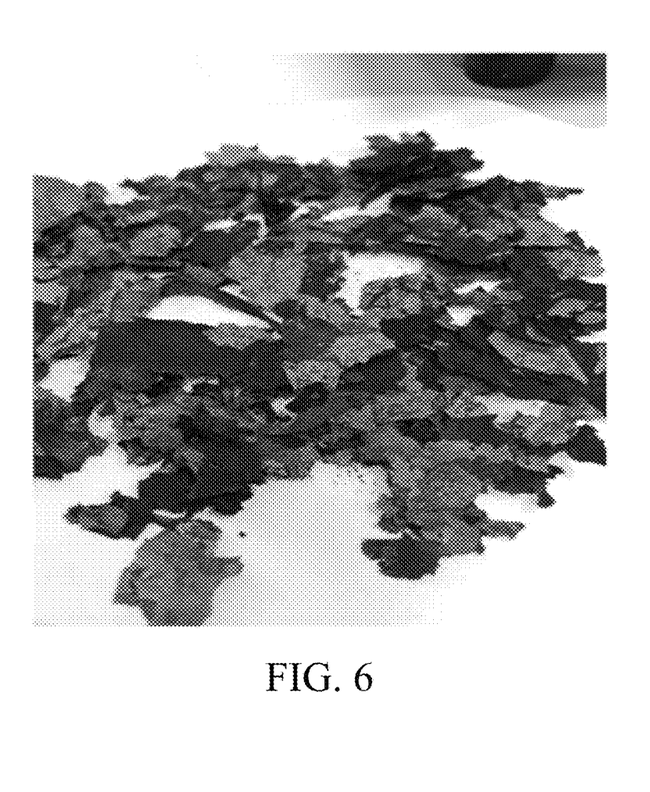
FIG. 6 is a photo illustrating the black phosphorus produced by the method of the present invention.
Figure 7:
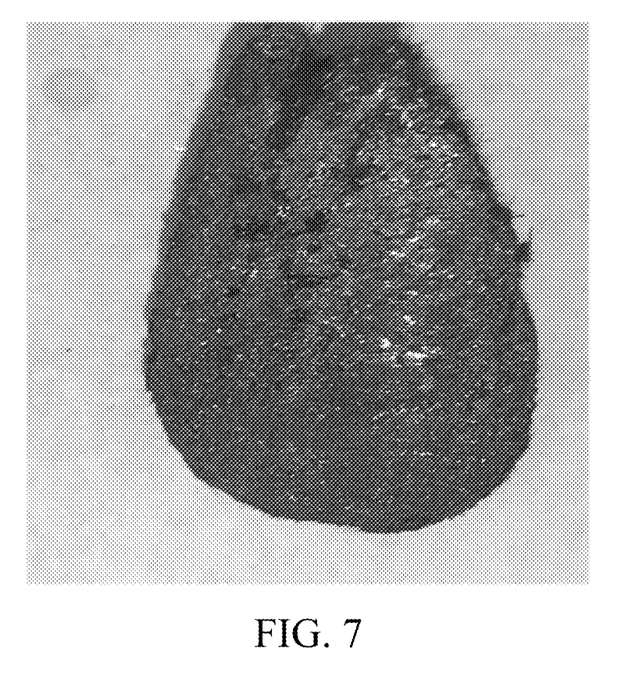
FIG. 7 is a photo illustrating the black phosphorus produced by the method of the present invention.
Figure 8:
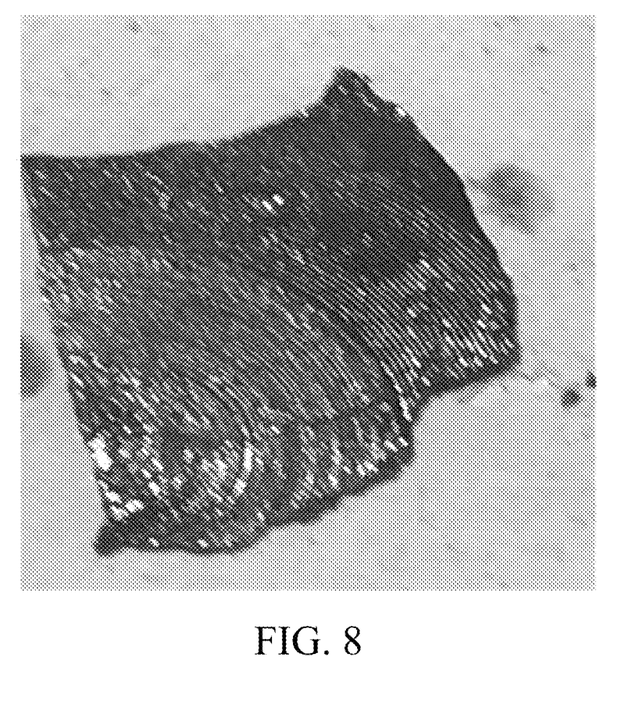
FIG. 8 is a photo illustrating the black phosphorus produced by the method of the present invention.
Figure 9:
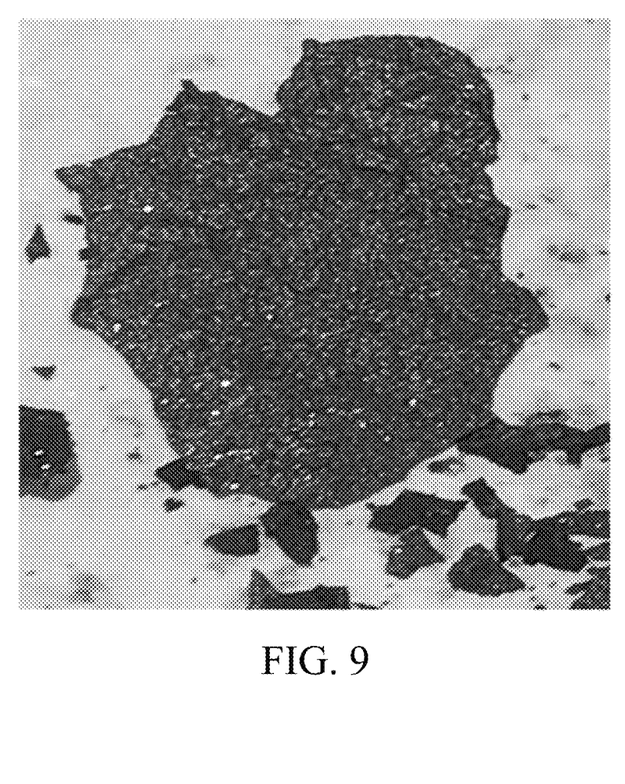
FIG. 9 is a photo illustrating the black phosphorus produced by the method of the present invention.

Referring to FIG. 1 and FIG. 2 of the drawings, a method of producing black phosphorus comprises the steps of:

(a) weighing reaction raw materials which comprises metallic tin, red phosphorus and monocrystalline iodine, wherein a weight ratio of tin: red phosphorus: iodine is 0.6-3.5: 5-45: 0.1-0.8; and weighing molybdenum or tungsten having a weight of 0.5~1% of a total weight of the reaction raw materials;

(b) mixing the reaction raw materials and molybdenum/tungsten uniformly to form a mixture;

(c) feeding the mixture to a high-temperature resistant metal reaction tube 20, or alternately, (c') feeding the mixture to a glass tube 40, replacing air inside the glass tube 40 by inert gas, closing a glass tube opening 44 of the glass tube 40 by a plug 42 and then placing the glass tube 40 inside a high-temperature resistant metal reaction tube 20;

(d) introducing inert gas to the high-temperature resistant metal reaction tube 20 to replace air inside the high-temperature resistant metal reaction tube 20 with the insert gas;

(e) closing and sealing the metal reaction tube 20 tightly by placing a high-temperature resistant metal gasket 24 on a flange member 22 of the metal reaction tube 20, covering the metal reaction tube 20 with the flange member 22 and tightening into position by a screw member 26;

(f) placing the metal reaction tube 20 inside a muffle furnace 60 for carrying out calcination reaction by controlling a temperature increase at a rate 50-80° C./h to a first reaction temperature and keeping warm, to a second reaction temperature and keeping warm and to a third reaction temperature and keeping warm, and then by controlling a temperature decrease at a rate of 40-80° C./h to a first cooling temperature and keeping warm, then to a second cooling temperature and keeping warm, and finally to room temperature, then obtaining a final product of black phosphorus.

Preferably, the step (f) is: placing the metal reaction tube 20 inside a muffle furnace 60 for carrying out calcination reaction by controlling a temperature increase at a rate 50-80° C./h to (i) a first reaction temperature of 500° C. and keeping warm for 10-30 minutes, (ii) a second reaction temperature of 550-580° C. and keeping warm for 30-60 minutes, and (iii) a third reaction temperature of 580-660° C. and keeping warm, and then by controlling a temperature decrease at a rate of 40-80° C./h to (i') a first cooling temperature of 500° C. and keeping warm for 10-60 minutes, then (ii') a second cooling temperature of 350° C. and keeping warm for 10-60 minutes, and finally (iii') room temperature, then obtaining a final product of black phosphorus.

Preferably, a weight ratio of tin: red phosphorus: iodine is 0.8-1.5: 15-25: 0.12-0.25. The third reaction temperature is 580-660° C. The high-temperature resistant metal reaction tube 20 is made of stainless steel, or iron, aluminum, copper, zinc, nickel, tin, antimony and/or lead and their metallic compound. The inert gas used in the glass tube 40 or the metal reaction tube 20 is argon or helium. The size of the high-temperature resistant metal reaction tube 20 is about 1.5~5 times of a size of the glass tube 40 so that the glass tube 40 can be put in and out of the metal reaction tube 20 easily.

It is worth mentioning that there is no particular pressure requirement for the calcination reaction. In general, the glass tube 40 is closed by the plug 42 during the reaction and the reaction occurs inside the glass tube 40. However, when the pressure is too high, the plug 42 of the glass tube 40 is capable of being unplugged from the glass tube opening 44 to release the pressure while all the reaction raw materials may spill inside the metal reaction tube 20.

Embodiment 1

According to this preferred embodiment of the present invention, a method of producing black phosphorus comprises the steps of:

(a) weighing reaction raw materials, wherein the reaction raw materials has a purity of 99.63% and comprises metallic tin in granular form having a particle size of 1.8 mm, red phosphorus in flake form and monocrystalline iodine in granular form having a particle size of 1.8 mm; and a weight ratio of tin: red phosphorus: iodine=1.4:16:0.24;

(b) mixing the reaction raw materials uniformly to form a mixture;

(c) feeding the mixture to a glass tube 40, replacing air inside the glass tube 40 by helium gas and close a glass tube opening 44 of the glass tube 40 by a plug 42 and then placing the glass tube 40 inside a high-temperature resistant metal reaction tube 20, wherein the high-temperature resistant metal reaction tube 20 is a rectangular tube made of stainless steel having a length of 165 cm, a width of 85 cm, a height of 85 cm and a volume of 4.5 times of a volume of the glass tube 40;

(d) introducing helium gas to the high-temperature resistant metal reaction tube 20 to replace air inside the high-temperature resistant metal reaction tube 20 with the helium gas;

(e) placing a high-temperature resistant metal gasket 24 on a flange member 22 of the metal reaction tube 20, covering the metal reaction tube 20 with the flange member 22 and tightening into position by a screw member 26;

(f) placing the metal reaction tube 20 inside a muffle furnace 60 for carrying out calcination reaction by controlling a temperature increase at a rate 70° C./h to increase a reaction temperature to 500° C. and keeping warm for 15 minutes, then 580° C. and keeping warm for 35 minutes and 590° C. and keeping warm for 7.5 hours, and then by controlling a temperature decrease at a rate of 65° C./h to decrease a cooling temperature to 500° C. and keeping warm for 20 minutes, 350° C. and keeping warm for 45 minutes and to room temperature, and then obtaining a final product of black phosphorus.

The final product of black phosphorus is in the flakes form and a conversion rate is 96.5%.

Embodiment 2

According to this preferred embodiment of the present invention, a method of producing black phosphorus comprises the steps of:

(a) weighing reaction raw materials, wherein the reaction raw materials have a purity of 99.51% and comprises metallic tin in granular form having a particle size of 1.3 mm, red phosphorus in flake form and monocrystalline iodine in granular form having a particle size of 1.5 mm; and a weight ratio of tin: red phosphorus: iodine=1.1:18:0.21;

(b) mixing the reaction raw materials uniformly to form a mixture;

(c) feeding the mixture to a high-temperature resistant metal reaction tube 20, wherein the high-temperature resistant metal reaction tube 20 is a rectangular tube made of $Sb_2O_4$ having a length of 85 cm, a width of 35 cm and a height of 35 cm;

(d) introducing helium gas to the high-temperature resistant metal reaction tube 20 to replace air inside the high-temperature resistant metal reaction tube 20 with the helium gas;

(e) placing a high-temperature resistant metal gasket 24 on a flange member 22 of the metal reaction tube 20, covering the metal reaction tube 20 with the flange member 22 and tightening into position by a screw member 26;

(f) placing the metal reaction tube 20 inside a muffle furnace 60 for carrying out calcination reaction by controlling a temperature increase at a rate 68° C./h to increase a reaction temperature to 500° C. and keeping warm for 25 minutes, then 580° C. and keeping warm for 50 minutes and 630° C. and keeping warm for 5.5 hours, and then by controlling a temperature decrease at a rate of 65° C./h to decrease a cooling temperature to 500° C. and keeping warm for 18 minutes, 350° C. and keeping warm for 25 minutes and to room temperature, and then obtaining a final product of black phosphorus.

The final product of black phosphorus is in the flakes form and a conversion rate is 97.2%.

Embodiment 3

According to this preferred embodiment of the present invention, a method of producing black phosphorus comprises the steps of:

(a) weighing reaction raw materials, wherein the reaction raw materials has a purity of 99.98% and comprises metallic tin in powder form, red phosphorus in flake form and monocrystalline iodine in granular form having a particle size of 1.5 mm; and a weight ratio of tin: red phosphorus: iodine=1.5:25:0.25;

(b) mixing the reaction raw materials uniformly to form a mixture;

(c) feeding the mixture a high-temperature resistant metal reaction tube 20, wherein the high-temperature resistant metal reaction tube 20 is a cylindrical tube made of stainless steel;

(d) introducing helium gas to the high-temperature resistant metal reaction tube 20 to replace air inside the high-temperature resistant metal reaction tube 20 with the helium gas;

(e) placing a high-temperature resistant metal gasket 24 on a flange member 22 of the metal reaction tube 20, covering the metal reaction tube 20 with the flange member 22 and tightening into position by a screw member 26;

(f) placing the metal reaction tube 20 inside a muffle furnace 60 for carrying out calcination reaction by controlling a temperature increase at a rate 80° C./h to increase a reaction temperature to 500° C. and keeping warm for 10 minutes, then 580° C. and keeping warm for 30 minutes and 660° C. and keeping warm for 6.5 hours, and then by controlling a temperature decrease at a rate of 80° C./h to decrease a cooling temperature to 500° C. and keeping warm for 10 minutes, 350° C. and keeping warm for 10 minutes and to room temperature, and then obtaining a final product of black phosphorus.

The final product of black phosphorus is in the flakes form and a conversion rate is 97.5%.

Embodiment 4

According to this preferred embodiment of the present invention, a method of producing black phosphorus comprises the steps of:

(a) weighing reaction raw materials, wherein the reaction raw materials have a purity of 99.99% and comprises metallic tin in powder form, red phosphorus in flake form and monocrystalline iodine in granular form having a particle size of 1.4 mm; and a weight ratio of tin: red phosphorus: iodine=1.0:20:0.18;

(b) adding molybdenum to the reaction raw materials and mixing uniformly to form a mixture, wherein an amount of molybdenum being added is 0.8% of the total weight of the reaction raw materials;

(c) feeding the mixture to a glass tube 40, replacing air inside the glass tube 40 by argon gas and close a glass tube opening 44 of the glass tube 40 by a plug 42 and then placing the glass tube 40 inside a high-temperature resistant metal reaction tube 20, wherein the high-temperature resistant metal reaction tube 20 is a cylindrical tube made of stainless steel having a diameter of 50 cm, a length of 165 cm, and a volume of 3.0 times of a volume of the glass tube 40;

(d) introducing argon gas to the high-temperature resistant metal reaction tube 20 to replace air inside the high-temperature resistant metal reaction tube 20 with the argon gas;

(e) placing a high-temperature resistant metal gasket 24 on a flange member 22 of the metal reaction tube 20, covering the metal reaction tube 20 with the flange member 22 and tightening into position by a screw member 26;

(f) placing the metal reaction tube 20 inside a muffle furnace 60 for carrying out calcination reaction by controlling a temperature increase at a rate 65° C./h to increase a reaction temperature to 500° C. and keeping warm for 20 minutes, then 580° C. and keeping warm for 45 minutes and 620° C. and keeping warm for 5 hours, and then by controlling a temperature decrease at a rate of 60° C./h to decrease a cooling temperature to 500° C. and keeping warm for 35 minutes, 350° C. and keeping warm for 35 minutes and to room temperature, and then obtaining a final product of black phosphorus.

The final product of black phosphorus is in the flakes form and a conversion rate is 99.1%.

Embodiment 5

According to this preferred embodiment of the present invention, a method of producing black phosphorus comprises the steps of:

(a) weighing reaction raw materials, wherein the reaction raw materials has a purity of 99.98% and comprises metallic tin in granular form having a particle size of 1.4 mm, red phosphorus in flake form and monocrystalline iodine in granular form having a particle size of 1.6 mm; and a weight ratio of tin: red phosphorus: iodine=1.2:20:0.17;

(b) adding tungsten to the reaction raw materials and mixing uniformly to form a mixture, wherein an amount of molybdenum being added is 0.7% of the total weight of the reaction raw materials;

(c) feeding the mixture to a glass tube 40, replacing air inside the glass tube 40 by argon gas and close a glass tube opening 44 of the glass tube 40 by a plug 42 and then placing the glass tube 40 inside a high-temperature resistant metal reaction tube 20, wherein the high-temperature resistant metal reaction tube 20 is a rectangular tube made of stainless steel having a length of 95 cm, a width of 50 cm, a height of 50 cm and a volume of 3.0 times of a volume of the glass tube 40;

(d) introducing argon gas to the high-temperature resistant metal reaction tube 20 to replace air inside the high-temperature resistant metal reaction tube 20 with the argon gas;

(e) placing a high-temperature resistant metal gasket 24 on a flange member 22 of the metal reaction tube 20, covering the metal reaction tube 20 with the flange member 22 and tightening into position by a screw member 26;

(f) placing the metal reaction tube 20 inside a muffle furnace 60 for carrying out calcination reaction by controlling a temperature increase at a rate 65° C./h to increase a reaction temperature to 500° C. and keeping warm for 20 minutes, then 580° C. and keeping warm for 45 minutes and 620° C. and keeping warm for 5 hours, and then by controlling a temperature decrease at a rate of 60° C./h to decrease a cooling temperature to 500° C. and keeping warm for 35 minutes, to 350° C. and keeping warm for 35 minutes and to room temperature, and then obtaining a final product of black phosphorus.

The final product of black phosphorus is in the flakes form and a conversion rate is 98.0%.

Embodiment 6

According to this preferred embodiment of the present invention, a method of producing black phosphorus comprises the steps of:

(a) weighing reaction raw materials, wherein the reaction raw materials have a purity of 99.98% and comprises metallic tin in powder form, red phosphorus in flake form and monocrystalline iodine in granular form having a particle size of 1.5 mm; and a weight ratio of tin: red phosphorus: iodine=1.5:25:0.25;

(b) adding molybdenum to the reaction raw materials and mixing uniformly to form a mixture, wherein an amount of molybdenum being added is 1% of the total weight of the reaction raw materials;

(c) feeding the mixture to a glass tube 40, replacing air inside the glass tube 40 by argon gas and close a glass tube opening 44 of the glass tube 40 by a plug 42 and then placing the glass tube 40 inside a high-temperature resistant metal reaction tube 20, wherein the high-temperature resistant metal reaction tube 20 is a cylindrical tube made of $Fe_3O_4$ having a diameter of 100 cm, a length of 200 cm, and a volume of 5 times of a volume of the glass tube 40;

(d) introducing argon gas to the high-temperature resistant metal reaction tube 20 to replace air inside the high-temperature resistant metal reaction tube 20 with the argon gas;

(e) placing a high-temperature resistant metal gasket 24 on a flange member 22 of the metal reaction tube 20, covering the metal reaction tube 20 with the flange member 22 and tightening into position by a screw member 26;

(f) placing the metal reaction tube 20 inside a muffle furnace 60 for carrying out calcination reaction by controlling a temperature increase at a rate 80° C./h to increase a reaction temperature to 500° C. and keeping warm for 10 minutes, then 580° C. and keeping warm for 30 minutes and 660° C. and keeping warm for 3 hours, and then by controlling a temperature decrease at a rate of 80° C./h to decrease a cooling temperature to 500° C. and keeping warm for 10 minutes, to 350° C. and keeping warm for 10 minutes and to room temperature, and then obtaining a final product of black phosphorus.

The final product of black phosphorus is in the flakes form and a conversion rate is 97.8%.

Embodiment 7

According to this preferred embodiment of the present invention, a method of producing black phosphorus comprises the steps of:

(a) weighing reaction raw materials, wherein the reaction raw materials have a purity of 99.98% and comprises metallic tin in powder form, red phosphorus in flake form and monocrystalline iodine in granular form having a particle size of 1.7 mm; and a weight ratio of tin: red phosphorus: iodine=0.8:15:0.12;

(b) adding molybdenum to the reaction raw materials and mixing uniformly to form a mixture, wherein an amount of molybdenum being added is 0.5% of the total weight of the reaction raw materials;

(c) feeding the mixture to a high-temperature resistant metal reaction tube 20, wherein the high-temperature resistant metal reaction tube 20 is a cylindrical tube made of $Al_2O_3$ having a diameter of 2.5 cm and a length of 10 cm;

(d) introducing argon gas to the high-temperature resistant metal reaction tube 20 to replace air inside the high-temperature resistant metal reaction tube 20 with the argon gas;

(e) placing a high-temperature resistant metal gasket 24 on a flange member 22 of the metal reaction tube 20, covering the metal reaction tube 20 with the flange member 22 and tightening into position by a screw member 26;

(f) placing the metal reaction tube 20 inside a muffle furnace 60 for carrying out calcination reaction by controlling a temperature increase at a rate 50° C./h to increase a reaction temperature to 500° C. and keeping warm for 30 minutes, then 550° C. and keeping warm for 60 minutes and 580° C. and keeping warm for 4 hours, and then by controlling a temperature decrease at a rate of 40° C./h to decrease a cooling temperature to 500° C. and keeping warm for 60 minutes, to 350° C. and keeping warm for 60 minutes and to room temperature, and then obtaining a final product of black phosphorus.

The final product of black phosphorus is in the flakes form and a conversion rate is 97.5%.

Embodiment 8

According to this preferred embodiment of the present invention, a method of producing black phosphorus comprises the steps of:

(a) weighing reaction raw materials, wherein the reaction raw materials have a purity of 99.96% and comprises metallic tin in granular form having a particle size of 1.2 mm, red phosphorus in flake form and monocrystalline iodine in granular form having a particle size of 1.2 mm; and a weight ratio of tin: red phosphorus: iodine=1.3:17:0.23;

(b) adding tungsten to the reaction raw materials and mixing uniformly to form a mixture, wherein an amount of tungsten being added is 0.6% of the total weight of the reaction raw materials;

(c) feeding the mixture to a high-temperature resistant metal reaction tube 20, wherein the high-temperature resistant metal reaction tube 20 is a rectangular tube made of CuO having a length of 45 cm, a width of 20 cm and a height of 20 cm;

(d) introducing argon gas to the high-temperature resistant metal reaction tube 20 to replace air inside the high-temperature resistant metal reaction tube 20 with the argon gas;

(e) placing a high-temperature resistant metal gasket 24 on a flange member 22 of the metal reaction tube 20, covering the metal reaction tube 20 with the flange member 22 and tightening into position by a screw member 26;

(f) placing the metal reaction tube 20 inside a muffle furnace 60 for carrying out calcination reaction by controlling a temperature increase at a rate 75° C./h to increase a reaction temperature to 500° C. and keeping warm for 25 minutes, then 580° C. and keeping warm for 45 minutes and 600° C. and keeping warm for 4.5 hours, and then by controlling a temperature decrease at a rate of 55° C./h to decrease a cooling temperature to 500° C. and keeping warm for 25 minutes, to 350° C. and keeping warm for 55 minutes and to room temperature, and then obtaining a final product of black phosphorus.

The final product of black phosphorus is in the flakes form and a conversion rate is 97.9%.

Embodiment 9

According to this preferred embodiment of the present invention, a method of producing black phosphorus comprises the steps of:

(a) weighing reaction raw materials, wherein the reaction raw materials have a purity of 99.95% and comprises metallic tin in powder form, red phosphorus in flake form and monocrystalline iodine in granular form having a particle size of 1.5 mm; and a weight ratio of tin: red phosphorus: iodine=1.2:19:0.19;

(b) adding molybdenum to the reaction raw materials and mixing uniformly to form a mixture, wherein an amount of molybdenum being added is 0.8% of the total weight of the reaction raw materials;

(c) feeding the mixture to a glass tube 40, replacing air inside the glass tube 40 by argon gas and close a glass tube opening 44 of the glass tube 40 by a plug 42 and then placing the glass tube 40 inside a high-temperature resistant metal reaction tube 20, wherein the high-temperature resistant metal reaction tube 20 is a cylindrical tube made of $SnO_2$ having a diameter of 85 cm, a length of 165 cm, and a volume of 3.3 times of a volume of the glass tube 40;

(d) introducing argon gas to the high-temperature resistant metal reaction tube 20 to replace air inside the high-temperature resistant metal reaction tube 20 with the argon gas;

(e) placing a high-temperature resistant metal gasket 24 on a flange member 22 of the metal reaction tube 20, covering the metal reaction tube 20 with the flange member 22 and tightening into position by a screw member 26;

(f) placing the metal reaction tube 20 inside a muffle furnace 60 for carrying out calcination reaction by controlling a temperature increase at a rate 55° C./h to increase a reaction temperature to 500° C. and keeping warm for 22 minutes, then 580° C. and keeping warm for 50 minutes and 640° C. and keeping warm for 4.5 hours, and then by controlling a temperature decrease at a rate of 66° C./h to decrease a cooling temperature to 500° C. and keeping warm for 32 minutes, to 350° C. and keeping warm for 42 minutes and to room temperature, and then obtaining a final product of black phosphorus.

The final product of black phosphorus is in the flakes form and a conversion rate is 98.4%.

Embodiment 10

According to this preferred embodiment of the present invention, a method of producing black phosphorus comprises the steps of:

(a) weighing reaction raw materials, wherein the reaction raw materials have a purity of 99.93% and comprises metallic tin in granular form having a particle size of 1.3 mm, red phosphorus in flake form and monocrystalline iodine in granular form having a particle size of 1.2 mm; and a weight ratio of tin: red phosphorus: iodine=0.6:5:0.1;

(b) adding tungsten to the reaction raw materials and mixing uniformly to form a mixture, wherein an amount of tungsten being added is 0.8% of the total weight of the reaction raw materials;

(c) feeding the mixture to a high-temperature resistant metal reaction tube 20, wherein the high-temperature resistant metal reaction tube 20 is a rectangular tube made of stainless steel having a length of 125 cm, a width of 75 cm and a height of 75 cm;

(d) introducing argon gas to the high-temperature resistant metal reaction tube 20 to replace air inside the high-temperature resistant metal reaction tube 20 with the argon gas;

(e) placing a high-temperature resistant metal gasket 24 on a flange member 22 of the metal reaction tube 20, covering the metal reaction tube 20 with the flange member 22 and tightening into position by a screw member 26;

(f) placing the metal reaction tube 20 inside a muffle furnace 60 for carrying out calcination reaction by controlling a temperature increase at a rate 60° C./h to increase a reaction temperature to 500° C. and keeping warm for 25 minutes, then 580° C. and keeping warm for 55 minutes and 730° C. and keeping warm for 4 hours, and then by controlling a temperature decrease at a rate of 50° C./h to decrease a cooling temperature to 500° C. and keeping warm for 25 minutes, to 350° C. and keeping warm for 30 minutes and to room temperature, and then obtaining a final product of black phosphorus.

The final product of black phosphorus is in the flakes form and a conversion rate is 98.5%.

Embodiment 11

According to this preferred embodiment of the present invention, a method of producing black phosphorus comprises the steps of:

(a) weighing reaction raw materials, wherein the reaction raw materials has a purity of 99.84% and comprises red phosphorus in flake form, metallic tin in powder form and monocrystalline iodine in granular form having a particle size of 1.7 mm; and a weight ratio of tin: red phosphorus: iodine=3.5:45:0.8;

(b) adding molybdenum to the reaction raw materials and mixing uniformly to form a mixture, wherein an amount of molybdenum being added is 0.9% of the total weight of the reaction raw materials;

(c) feeding the mixture to a glass tube 40, replacing air inside the glass tube 40 by inert gas and close a glass tube opening 44 of the glass tube 40 by a plug 42 and then placing the glass tube 40 inside a high-temperature resistant metal reaction tube 20, wherein the high-temperature resistant metal reaction tube 20 is a cylindrical tube made of lead (Pb) having a diameter of 85 cm, a length of 165 cm and a volume of 3.3 times of a volume of the glass tube 40;

(d) introducing inert gas to the high-temperature resistant metal reaction tube 20 to replace air inside the high-temperature resistant metal reaction tube 20 with the inert gas;

(e) placing a high-temperature resistant metal gasket 24 on a flange member 22 of the metal reaction tube 20, covering the metal reaction tube 20 with the flange member 22 and tightening into position by a screw member 26;

(f) placing the metal reaction tube 20 inside a muffle furnace 60 for carrying out calcination reaction by controlling a temperature increase at a rate 65° C./h to increase a reaction temperature to 500° C. and keeping warm for 26 minutes, then 580° C. and keeping warm for 36 minutes and 615° C. and keeping warm for 5 hours, and then by controlling a temperature decrease at a rate of 73° C./h to decrease a cooling temperature to 500° C. and keeping warm for 50 minutes, 350° C. and keeping warm for 30 minutes and to room temperature, and then obtaining a final product of black phosphorus.

The final product of black phosphorus is in the flakes form and a conversion rate is 97.2%.

Embodiment 12

According to this preferred embodiment of the present invention, a method of producing black phosphorus comprises the steps of:

(a) weighing reaction raw materials, wherein the reaction raw materials have a purity of 99.77% and comprises red phosphorus in flake form, metallic tin in powder form and monocrystalline iodine in granular form having a particle size of 1.7 mm; and a weight ratio of tin: red phosphorus: iodine=1.4:16:0.23;

(b) mixing uniformly to form a mixture;

(c) feeding the mixture to a glass tube 40, replacing air inside the glass tube 40 by argon gas and close a glass tube opening 44 of the glass tube 40 by a plug 42 and then placing the glass tube 40 inside a high-temperature resistant metal reaction tube 20, wherein the high-temperature resistant metal reaction tube 20 is a cylindrical tube made of zinc (Zn) having a diameter of 25 cm, a length of 45 cm and a volume of 2.4 times of a volume of the glass tube 40;

(d) introducing argon gas to the high-temperature resistant metal reaction tube 20 to replace air inside the high-temperature resistant metal reaction tube 20 with the argon gas;

(e) placing a high-temperature resistant metal gasket 24 on a flange member 22 of the metal reaction tube 20, covering the metal reaction tube 20 with the flange member 22 and tightening into position by a screw member 26;

(f) placing the metal reaction tube 20 inside a muffle furnace 60 for carrying out calcination reaction by controlling a temperature increase at a rate 63° C./h to increase a reaction temperature to 500° C. and keeping warm for 22 minutes, then 580° C. and keeping warm for 48 minutes and 650° C. and keeping warm for 3.5 hours, and then by controlling a temperature decrease at a rate of 54° C./h to decrease a cooling temperature to 500° C. and keeping warm for 54 minutes, 350° C. and keeping warm for 24 minutes and to room temperature, and then obtaining a final product of black phosphorus.

The final product of black phosphorus is in the flakes form and a conversion rate is 97.6%.

The final product of black phosphorus produced by embodiment 1-12 has a large surface area and a flaky structure with a metallic luster at the same time, thus classifying as high quality black phosphorus.

The black phosphorus, which is of very high quality, produced by embodiments 1-12 are illustrated by FIGS. 3-9 of the drawings.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of producing black phosphorus, comprising the steps of:

(a) weighing reaction raw materials which comprises metallic tin, red phosphorus and monocrystalline iodine, wherein a weight ratio of tin: red phosphorus: iodine is 0.6-3.5: 5-45: 0.1-0.8;

(b) mixing the reaction raw materials uniformly to form a mixture;

(c) feeding the mixture to a glass tube, replacing air inside the glass tube by inert gas, closing a glass tube opening of the glass tube by a plug and then placing the glass tube inside a high-temperature resistant metal reaction tube;

(d) introducing inert gas to the high-temperature resistant metal reaction tube to replace air inside the high-temperature resistant metal reaction tube with the inert gas;

(e) closing and sealing the metal reaction tube tightly; and (f) placing the metal reaction tube inside a muffle furnace for carrying out calcination reaction by controlling a temperature increase at a rate 50-80° C./h from room temperature to a first reaction temperature, a second reaction temperature and then a third reaction temperature sequentially, and then by controlling a temperature decrease at a rate of 40-80° C./h to a first cooling temperature, a second cooling temperature, and finally to the room temperature sequentially, then obtaining a final product of black phosphorus, wherein the third reaction temperature is greater than the second reaction temperature; and the second reaction temperature is greater than the first reaction temperature; and the first reaction temperature is greater than the room temperature, wherein after reaching the first reaction temperature, the first reaction temperature is maintained for a first time period, after reaching the second reaction temperature, the second reaction temperature is maintained for a second time period, and after reaching the third reaction temperature, the third reaction temperature is maintained for a third time period, wherein after reaching the first cooling temperature, the first cooling temperature is maintained for a first cooling time period, after reaching the second cooling temperature, the second cooling temperature is maintained for a second cooling time period, wherein a total time of the first time period, the second time period and the third time period is approximately 3-8 hours and the third reaction temperature is 520° C.-760° C., wherein a weight ratio of tin: red phosphorus: iodine is 0.8-1.5: 15-25: 0.12-0.25, the reaction raw materials further comprise molybdenum or tungsten having a weight of 0.5-1% of a total weight of the reaction raw materials, the third reaction temperature is 580-660° C., and a volume of the high-temperature resistant metal reaction tube is about 1.5-5 times of a volume of the glass tube.

* * * * *